United States Patent

Lotsch

[11] 4,271,309
[45] Jun. 2, 1981

[54] ISOINDOLINE COLORANTS

[75] Inventor: Wolfgang Lotsch, Beindersheim, Fed. Rep. of Germany

[73] Assignee: BASF Aktiengesellschaft, Fed. Rep. of Germany

[21] Appl. No.: 127,145

[22] Filed: Mar. 4, 1980

[30] Foreign Application Priority Data

Mar. 12, 1979 [DE] Fed. Rep. of Germany ....... 2909567

[51] Int. Cl.$^3$ .......................................... C07D 401/14
[52] U.S. Cl. ..................................... 548/364; 260/147
[58] Field of Search ......................................... 548/364

[56] References Cited

U.S. PATENT DOCUMENTS 3,646,033  2/1972  Leister et al. ........................ 544/353
3,780,057  12/1973  Frey ..................................... 548/364

FOREIGN PATENT DOCUMENTS 1025080  2/1958  Fed. Rep. of Germany .
 858601  11/1940  France ..................................... 548/364

Primary Examiner—Henry R. Jiles
Assistant Examiner—Natalia Harkaway
Attorney, Agent, or Firm—Oblon, Fisher, Spivak, McClelland & Maier

[57] ABSTRACT

Isoindoline colorants of the formula

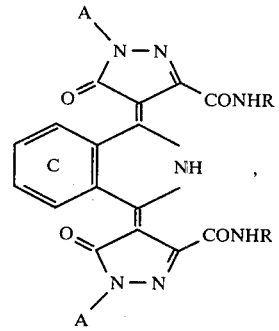

where
A is hydrogen or phenyl and
R is hydrogen, $C_1$–$C_4$-alkyl or phenyl and
the phenyl radicals in A and R and the ring C,
independently of one another, do not carry further substituents or are substituted by groups which do not confer solubility, the two A's being identical or different.

In finishes, printing inks and plastics, the colorants give very deep black colorations which exhibit high light-fastness, fastness to weathering and fastness to overcoating, and have a very high infrared reflectance.

4 Claims, No Drawings

ISOINDOLINE COLORANTS

The present invention relates to novel isoindoline colorants and to their preparation and use.

The novel isoindoline colorants have the general formula

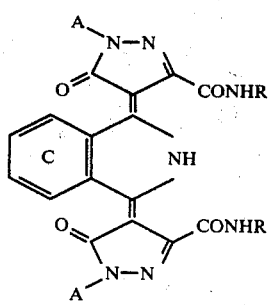

(I)

where

A is hydrogen or phenyl and

R is hydrogen, C$_1$-C$_4$-alkyl or phenyl and the phenyl radicals and the ring C are unsubstituted or substituted by groups which do not confer solubility, and the two A's may be identical or different.

The isoindoline colorants according to the invention, when used in finishes, plastics and printing inks, give very deep black colorations which have very good lightfastness, fastness to weathering and fastness to overcoating, and a very high infrared reflectance.

For the purposes of the invention, substituents which do not confer solubility are those which do not result in the colorant being soluble in water or in organic solvents. Examples of such substituents are halogen, alkyl or alkoxy each of 1 to 6 carbon atoms, nitro, trifluoromethyl, carbamyl, ureido, sulfamyl and cyano; alkoxycarbonyl, alkanoyl, N-alkylcarbamyl, N-alkylureido or alkanoylamino, each of a total of 2 to 6 carbon atoms; alkylsulfonyl and alkylsulfamyl each of 1 to 6 carbon atoms; aryloxycarbonyl, aroyl, aroylamino, arylsulfonyl, N-arylcarbamyl, N-arylsulfamyl, aryl, N-arylureido and arylazo, and fused 5-membered and 6-membered hetero-rings containing a

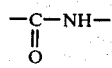

group in the ring.

Preferred substituents which do not confer solubility are chlorine, bromine, carbamyl, sulfamyl, C$_2$-C$_4$-alkanoylamino and benzoylamino.

Amongst the compounds of the formula I, those of the formula II

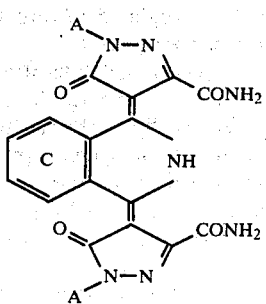

(II)

where A and C have the above meanings are preferred for tinctorial reasons.

Particularly preferred compounds of the formula II are those where the ring C does not carry further substituents.

Very particularly preferred compounds of the formula II are those where the ring C does not carry further substituents and A is phenyl, 3-chlorophenyl or 4-chlorophenyl.

Colorants of the formula I directly suitable for pigmentary purposes are obtained by condensing one mole of a diiminoisoindoline of the formula III

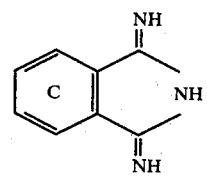

(III)

with 2 moles of a pyrazolone of the formula IV

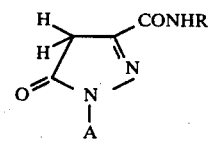

(IV)

where A, R and C have the above meanings.

Where, in formula I, the two A's and/or R's are to be different, mixtures of pyrazolones of the formula IV may be condensed with the diiminoisoindoline III.

It is however also possible, in accordance with Example 80 of German Laid-Open Application DOS No. 1,670,748, first to condense 1 mole of a pyrazolone IV on one side of the molecule with 1 mole of the diiminoisoindoline III (to give the semi-condensation product) and, in a second stage, to react the semi-condensation product further with another pyrazolone of the formula IV to give the unsymmetrical colorant of the formula I. When carrying out the reaction in one stage, or, in the case of a stepwise reaction, when carrying out the last stage, a slight excess, for example of up to 20%, of pyrazolone IV can be of advantage.

The condensation of the diiminoisoindolines of the formula III with the pyrazolones of the formula IV is carried out in water, advantageously in an organic solvent or diluent. The condensation takes place particularly effectively in aliphatic monocarboxylic or dicarboxylic acids, eg. formic acid, acetic acid, propionic acid or mixtures of these, which is why these solvents are preferred. The amount of the solvent used is not critical. The minimum amount is determined by the need to be able to stir the reaction mixture. In general, from 10 to 20 parts by weight of solvent per part by weight of pyrazolone are employed.

The reaction is as a rule carried out at from 50° C. to 150° C., preferably from 70° C. to 120° C.

The products are isolated from the reaction mixture by filtration and can in general be employed directly as pigments. However, it is also possible to convert the products, by conventional conditioning processes, into the optimum pigmentary form for the particular end use.

The Examples which follow illustrate the invention. Parts and percentages are by weight.

EXAMPLE 1

42 parts of 1-phenyl-pyrazol-5-one-3-carboxamide and 20 parts of the monoadduct of ethylene glycol with diiminoisoindoline are stirred in 650 parts of glacial acetic acid for 2 hours at room temperature and 3 hours at 100° C. After the mixture has cooled, it is filtered and the product is washed with glacial acetic acid and methanol. 50 parts of the pigment of the formula

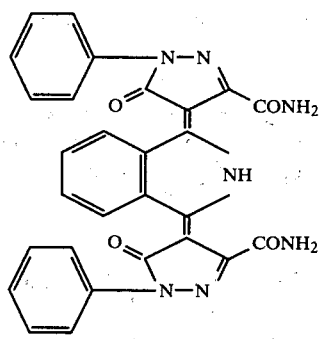

are obtained.

In a finish, the pigment gives a deep black hue. The colorations have good fastness to migration, lightfastness and fastness to weathering. The high infrared reflectance of the colorations deserves particular mention.

EXAMPLES 2 TO 6

Black pigments with similar properties are obtained if the procedure described in Example 1 is followed but the 1-phenyl-pyrazol-5-one-3-carboxamide is replaced by the following pyrazolones:

| Example | Pyrazolone of the formula IV | Colorant of the formula I, where |
|---|---|---|
| 2 | H, H, CONH₂, O, N, N, (4-Cl-phenyl) | A = 4-Cl-phenyl; R = H |
| 3 | H, H, CONH₂, O, N, N, (3-Cl-phenyl) | A = 3-Cl-phenyl; R = H |
| 4 | H, H, CONH₂, O, N, N, (4-CH₃-phenyl) | A = 4-CH₃-phenyl; R = H |
| 5 | H, H, CONH—CH₃, O, N, N, (4-Cl-phenyl) | A = 4-Cl-phenyl; R = —CH₃ |
| 6 | H, H, CONH—phenyl, O, N, N, (4-Cl-phenyl) | A = 4-Cl-phenyl; R = phenyl |

EXAMPLE 7 (USE EXAMPLE)

(a) Finish 10 parts of the colorant obtained as described in Example 1 and 95 parts of a baking finish mixture which contains 70% of coconut alkyd resin (as a 60% strength solution in xylene) and 30% of melamine resin (as a solution of about 55% strength in butanol/xylene) are ground in an attrition mill. After applying the finish and baking it for 30 minutes at 120° C., black full-shade coatings having good lightfastness and fastness to overspraying are obtained. If titanium dioxide is incorporated into the mixture, grey to black colorations are obtained.

If the colorants described in Examples 2 to 6 are used, coatings in similar black hues and having similar properties are obtained.

(b) Plastic 0.5 part of the colorant obtained as described in Example 1 is applied to 100 parts of polystyrene granules (standard grade) by tumbling. The surface-colored granules are homogenized by extrusion at 190°–195° C. Black extrudates, in which the coloration has good lightfastness, are obtained.

If mixtures of 0.5 part of colorant and 1 part of titanium dioxide are used, high-hiding, greyish black colorations are obtained.

If the colorants obtained as described in Examples 2 to 6 are used, colorations having virtually the same properties are obtained.

(c) Printing ink 8 parts of the colorant obtained as described in Example 1, 40 parts of a phenol/formaldehyde-modified rosin and from 55 to 65 parts of toluene are thoroughly mixed in a disperser. A black toluene-based gravure printing ink is obtained. The prints obtained with this ink exhibit good lightfastness.

If the colorants from Examples 2 to 6 are used, similar results are obtained.

I claim:

1. An isoindoline colorant of the formula:

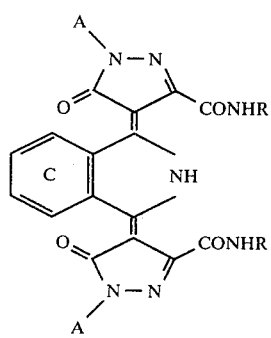

where
A is hydrogen or phenyl; and
R is hydrogen, $C_1$–$C_4$-alkyl or phenyl; and
the phenyl radicals in A and R and the ring C, independently of one another, do not carry further substituents or are substituted by groups which do not confer solubility selected from the group consisting of chlorine, bromine, carbamyl, sulfamyl, $C_2$–$C_4$-alkanoylamino and benzoylamino; and
the two A's being identical or different.

2. An isoindoline colorant as claimed in claim 1, where R is hydrogen.

3. An isoindoline colorant as claimed in claim 1, where R is hydrogen and the ring C does not carry further substituents.

4. An isoindoline colorant of the formula:

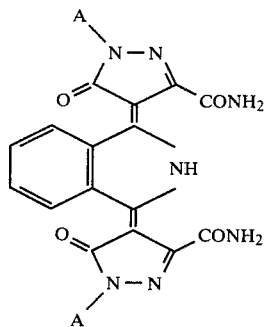

where A is phenyl, 3-chlorophenyl or 4-chlorophenyl.

* * * * *